No. 880,970. PATENTED MAR. 3, 1908.
C. J. CARLSON.
ROAD DRAG.
APPLICATION FILED DEC. 11, 1907.
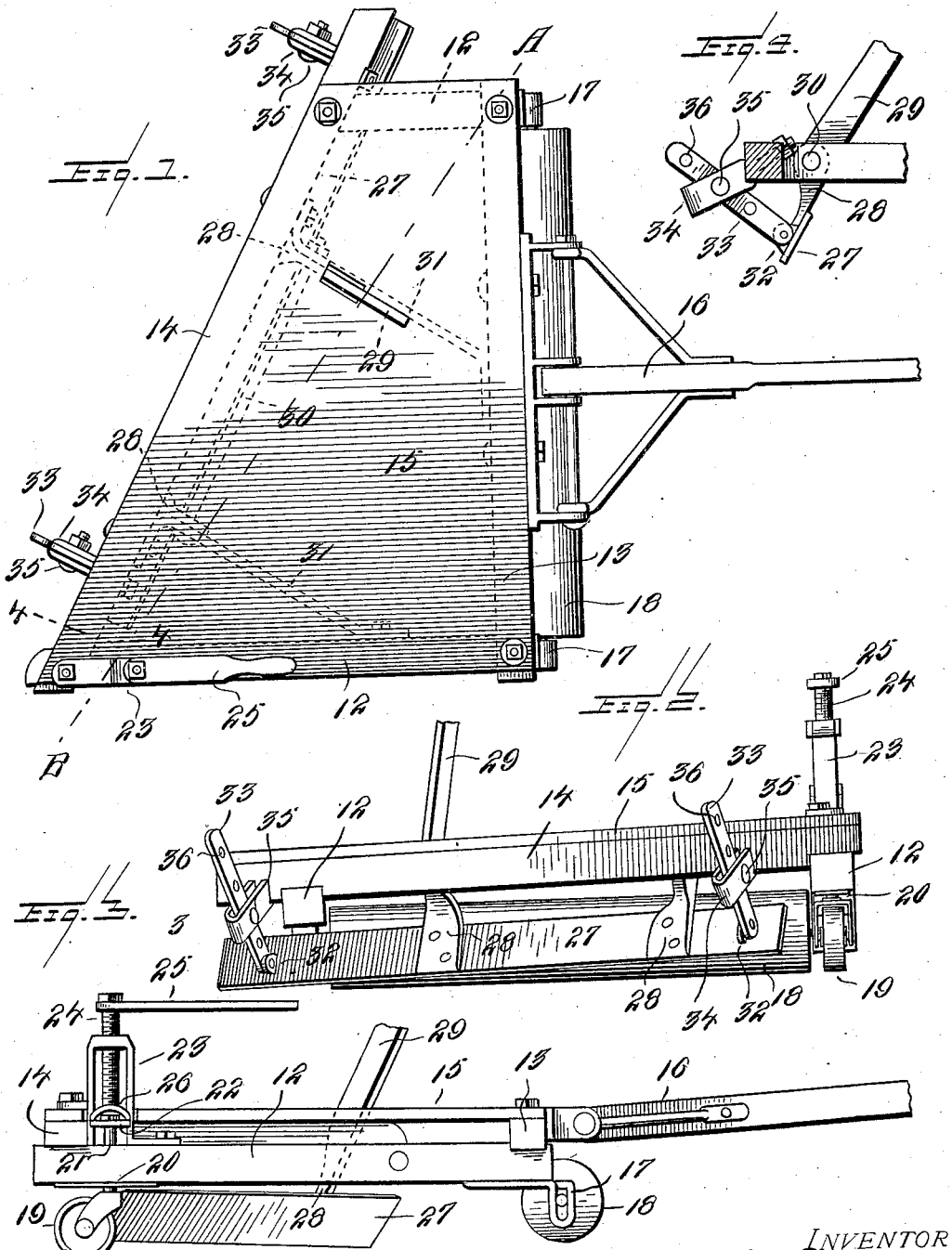
WITNESSES
INVENTOR
Carl J. Carlson,
BY
Attorneys

UNITED STATES PATENT OFFICE.

CARL J. CARLSON, OF WAHOO, NEBRASKA.

ROAD-DRAG.

No. 880,970.　　　Specification of Letters Patent.　　　Patented March 3, 1908.

Application filed December 11, 1907. Serial No. 406,025.

*To all whom it may concern:*

Be it known that I, CARL J. CARLSON, a citizen of the United States, residing at Wahoo, in the county of Saunders and State of Nebraska, have invented or discovered certain new and useful Improvements in Road-Drags, of which the following is a specification, reference being had therein to the accompanying drawings.

This invention relates to road drags or scrapers designed for the purpose of grading, smoothing and finishing roads.

The objects of my invention are to provide a device of the character referred to which shall be simple and inexpensive in construction but reliable in operation, and which may be adjusted in accordance with the transverse section of the road being operated upon and further controlled in a simple manner to regulate the position of the scraper blade for changing the depth of cut and for other purposes.

To these ends my invention comprises certain novel constructions and combinations of parts all as hereinafter described and particularly pointed out in the claims.

In the accompanying drawings, which illustrate one construction in which my invention may be embodied: Figure 1 is a plan view of my improved road drag. Fig. 2 is a rear elevation thereof. Fig. 3 is a side elevation. Fig. 4 is a detail sectional view taken substantially on the plane indicated by the line 4—4, Fig. 1.

The main frame of my improved drag is substantially trapezoidal in shape and preferably comprises two parallel longitudinal bars or members 12, 12, of different length, a forward transverse bar or member 13, and a rear inclined bar or member 14. Upon this frame is preferably constructed a suitable platform 15 upon which the driver or operator may stand, while at the forward end of said frame, preferably to the bar or member 13, is secured a suitable shaft 16 or other device to which a team of horses or other source of motive power may be attached.

Secured to the bar or member 13 is a pair of brackets 17, 17 providing bearings for a roller 18, said bearings being constructed to permit a certain amount of vertical movement of the roller 18 with respect to the frame at both ends thereof. Said frame is supported at its rear end by a single wheel 19 journaled in a bearing 20 provided with a projection or pintle 21 passing through an opening in the longer bar or member 12 and free to turn and move vertically therein. Means are provided for adjusting the position of the pintle 21 with respect to the bar o member 12 and consequently for adjusting the vertical position of the rear corner of the frame supported by the wheel 19 with respect to said wheel, said means preferably and as herein shown being as follows.

At the upper side of the bar or member 12 is swiveled to the pintle 21 a plate 22 guided for vertical movement in a substantially U-shaped frame 23 suitably secured to the main frame, said U-shaped frame having at its upper end a threaded aperture through which passes an operating screw 24 having at its upper end a suitable operating handle or lever 25. Swiveled to the lower end of the screw 24 is a suitable plate or foot-piece 26, also guided in the frame 23 and adapted to bear upon the plate 22. As will now be seen, turning of the screw 24 will effect a rising or falling movement of that corner of the main frame supported by the wheel 19.

The inclined scraper blade 27 is provided with a pair of lugs or brackets 28, 28, one of which may, if desired, be prolonged into an operating handle 29. Said lugs or brackets 28 are journaled upon a suitable rod 30 suitably secured to the main frame, preferably to the brackets or braces 31, 31. Said scraper blade is also provided at its rearside with a second pair of lugs 32, 32, to which are pivoted links 33, 33, passing upwardly through brackets 34, 34, secured to the main frame, said links being adapted to be held in any desired position in said brackets by pins 35, 35, passing through suitable openings in the brackets 34 and openings 36 in the links 33, by which means the inclination of the scraper blade with respect to a vertical plane transverse to the machine may be adjusted.

As will now be obvious the initial or normal inclination of the scraper blade 27 with respect to a horizontal plane may be adjusted in accordance with the requirements of the work by means of the screw 24. It will further be seen, however, that this position of the scraper blade is not absolutely fixed since, by reason of the loose bearings of the roller 18 and the single support afforded to the rear of the frame by the wheel 19, the main frame of the machine will be free to tilt or turn to a greater or less extent, determined by the adjustment of the wheel 19, the adjustment of the scraper blade on its supporting rod 30, and the configuration of the ground, about a diagonal axis, indicated by the broken line A—B on Fig. 1, passing through the corner of the frame supported by the wheel 19. The wheel 19 having been set in accordance with the configuration of the road, thereby determining the limit of the movement of the blade 27 with respect to the axis A—B, the driver or operator, under normal conditions, takes his position on the platform 15 substantially over the forward end of the scraper blade, or, in the construction shown, at the rear left hand corner of said platform. The forward end of the scraper blade will now be depressed, removing the earth from the side of the road and spreading it across the surface thereof adjacent the center. If now the operator wishes to lift the forward end of the scraper blade to clear an obstruction, or if for any other reason it becomes desirable to bring the blade into a more nearly horizontal position, he has only to step forward across the axis A—B, or toward the forward right hand corner of the platform 15 in the construction shown, when the frame will be tilted and the forward end of the scraper blade raised, this being accomplished without the aid of any levers or other mechanism.

Road grading machines of the general type of mine are usually used in connection with a plow or other device which precedes the scraper to loosen the earth in the road, the scraper or grader following and removing and spreading the earth loosened by the plow. In machines as heretofore constructed, in which the scraper blades are supported by wheels and adjusted by levers or other mechanism, the weight of the machine rests upon these wheels, and as a consequence it has been found that the earth is not evenly and firmly packed. With my construction, however, it will be observed that a large proportion of the weight of the machine as well as that of the operator falls upon the scraper blade which accordingly serves not only to remove the loose earth thrown up by the plow and properly spread the same across the road, but to compress and pack this earth and thereby leave the road firm and compact without further rolling or other treatment.

While I, in order that my invention may be readily understood, have shown and described the same as embodied in a particular construction, I wish it to be distinctly understood that I do not limit myself to the precise construction shown, it being obvious that many changes might be made therein without departing from the spirit and scope of my invention.

Having thus described my invention what I claim as my invention and desire to secure by Letters Patent is:—

1. In a device of the character described, the combination with a scraper blade and means for supporting the same, of means for adjusting the inclination of said scraper blade, said parts being constructed and arranged to permit a further adjustment of said scraper blade independent of said adjusting means.

2. In a device of the character described, the combination with a scraper blade and means for supporting the same, of means for adjusting the inclination of said scraper blade with respect to a horizontal plane, said parts being constructed and arranged to permit a further adjustment of said scraper blade with respect to a horizontal plane independent of said adjusting means.

3. In a device of the character described, the combination with a scraper blade and means for supporting the same adapted to permit movement of said scraper blade within certain limits, of means for adjusting one of the limits of movement of said scraper blade.

4. In a device of the character described, the combination with a scraper blade and means for supporting the same adapted to permit movement of said scraper blade with respect to a horizontal plane within certain limits, of means for adjusting one of the limits of movement of said scraper blade.

5. In a device of the character described, the combination with a frame and a scraper blade carried by said frame, of means for loosely supporting said frame at one end, and a single support for said frame at its opposite end.

6. In a device of the character described, the combination with a frame and a scraper blade carried by said frame, of means for loosely supporting said frame at one end, and a single adjustable support for said frame at its opposite end.

7. In a device of the character described, the combination with a frame and a scraper blade carried by said frame, of a roller, journals for said roller at one end of said frame constructed to permit relative vertical movement of said roller and frame, and a single wheel for supporting said frame at its opposite end.

8. In a device of the character described, the combination with a frame and a scraper blade carried by said frame, of a roller, journals for said roller at one end of said frame constructed to permit relative vertical movement of said roller and frame, and a single vertically adjustable wheel for supporting said frame at its opposite end.

9. In a device of the character described, the combination with a frame and a scraper blade carried by said frame, of a roller, journals for said roller at the forward end of said frame constructed to permit relative vertical movement of said roller and frame, and a single wheel for supporting said frame at its rearward end.

10. In a device of the character described, the combination with a frame and a scraper blade carried by said frame, of means for supporting said frame constructed to permit free tilting movement thereof.

11. In a device of the character described, the combination with a frame and a scraper blade carried by said frame, of means for supporting said frame constructed to permit free tilting movement thereof about a substantially diagonal axis.

12. In a device of the character described, the combination with a frame and a scraper blade carried by said frame, of means for supporting said frame constructed to permit free tilting movement thereof about an axis transverse to said scraper blade.

13. In a device of the character described, the combination with a frame and a scraper blade carried by said frame, of means for supporting said frame constructed to permit free tilting movement thereof, and means for limiting the amount of said tilting movement.

14. In a device of the character described, the combination with a frame and a scraper blade carried by said frame, of means for supporting said frame constructed to permit tilting movement thereof, and adjustable means for limiting the amount of said tilting movement.

15. In a device of the character described, the combination with a frame and a scraper blade carried by said frame, of a wheel for supporting said frame, a bearing for said wheel provided with a projection vertically movable with respect to said frame, and an adjusting screw mounted on said frame and engaging said projection.

16. In a device of the character described, the combination with a frame, of a scraper blade pivotally mounted on said frame, links carried by said scraper blade, lugs on said frame, and means for adjustably connecting said links and lugs.

17. In a device of the character described, a scraper blade constructed and arranged to spread the road material and to compress and pack the same.

18. In a device of the character described a scraper blade and means for supporting the same at one end, the opposite end of said blade being left unsupported and free to bear upon the surface of the road.

In testimony whereof I affix my signature, in presence of two witnesses.

CARL J. CARLSON.

Witnesses:
AUG EICHINEUR,
TRENMOR CONE.